(12) United States Patent
Griffiths et al.

(10) Patent No.: US 11,549,687 B2
(45) Date of Patent: Jan. 10, 2023

(54) COMBUSTION STAGING SYSTEM (71) Applicant: ROLLS-ROYCE plc, London (GB)

(72) Inventors: Michael Griffiths, Bromsgrove (GB); Daniel J. Bickley, Solihull (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 16/916,589

(22) Filed: Jun. 30, 2020

(65) Prior Publication Data
US 2021/0018177 A1    Jan. 21, 2021

(30) Foreign Application Priority Data
Jul. 17, 2019    (GB) ..................................... 1910224

(51) Int. Cl.
| F23R 3/34 | (2006.01) |
| F02C 7/228 | (2006.01) |
| F02C 7/232 | (2006.01) |
| F02C 7/36 | (2006.01) |
| F02C 9/26 | (2006.01) |

(52) U.S. Cl.
CPC .............. *F23R 3/343* (2013.01); *F02C 7/228* (2013.01); *F02C 7/232* (2013.01); *F02C 7/36* (2013.01); *F02C 9/263* (2013.01); *F05D 2220/323* (2013.01)

(58) Field of Classification Search
CPC .......... F02C 7/222; F02C 7/228; F02C 9/263; F23R 3/343; F23R 3/346
See application file for complete search history.

(56) References Cited

U.S. PATENT DOCUMENTS

| 7,921,651 B2* | 4/2011 | Alexander ................ F02C 9/40 |
| | | 60/776 |
| 8,001,761 B2* | 8/2011 | Myers, Jr. ............... F23R 3/286 |
| | | 60/39.281 |
| 10,907,824 B2* | 2/2021 | Snodgrass ............... F23D 11/38 |
| 2010/0058770 A1* | 3/2010 | Ryan ....................... F23R 3/343 |
| | | 60/776 |

(Continued)

FOREIGN PATENT DOCUMENTS

GB    2523126 A    8/2015

OTHER PUBLICATIONS

European search report dated Nov. 9, 2020, issued in EP patent application No. 20180611.

(Continued)

*Primary Examiner* — Arun Goyal
(74) *Attorney, Agent, or Firm* — Shumaker & Sieffert, P.A.

(57) ABSTRACT

A combustion staging system for fuel injectors of a multi-stage combustor of a gas turbine engine. The system includes plural fuel injectors, each having respective pilot and mains injection stages. It further includes a splitting unit which, to perform staging control of the combustor, receives a metered fuel flow and, for pilot and mains operation, controllably splits the received fuel flow into a pilot flow for injecting at the pilot stages of the injectors and a mains flow for injecting at the mains stages of the injectors, and for pilot-only operation, controllably splits the received fuel flow into a first part of the pilot flow for injecting at the pilot stages of a first portion of the injectors and a second part of the pilot flow for injecting at the pilot stages of a second portion of the injectors.

8 Claims, 7 Drawing Sheets

(56) References Cited

U.S. PATENT DOCUMENTS

2017/0298840 A1   10/2017  Doody
2018/0066588 A1*  3/2018  Daly ........................ F02C 7/228
2018/0372321 A1   12/2018  Yates et al.
2018/0372322 A1   12/2018  Bickley

OTHER PUBLICATIONS

Great Britain search report dated Jan. 10, 2020, issued in GB Patent Application No. 1910224.3.
Response to Extended European Search Report from counterpart EP Application No. 20180611.4 dated Nov. 23, 2020, filed Feb. 8, 2021, 4 pgs.

* cited by examiner

COMBUSTION STAGING SYSTEM

CROSS-REFERENCE TO RELATED APPLICATIONS

This specification is based upon and claims the benefit of priority from United Kingdom patent application number GB 1910224.3 filed on Jul. 17, 2019, the entire contents of which is incorporated herein by reference.

BACKGROUND

Technical Field

The present disclosure relates to a combustion staging system for fuel injectors of a multi-stage combustor of a gas turbine engine.

Description of the Related Art

Multi-stage combustors are used particularly in lean burn fuel systems of gas turbine engines to reduce unwanted emissions while maintaining thermal efficiency and flame stability. For example, duplex fuel injectors have pilot and mains fuel manifolds feeding pilot and mains discharge orifices of the injectors. At low power conditions only the pilot stage is activated, while at higher power conditions both pilot and mains stages are activated. The fuel for the manifolds typically derives from a pumped and metered supply. A splitting unit can then be provided to selectively split the metered supply between the manifolds as required for a given staging.

A typical annular combustor has a circumferential arrangement of fuel injectors, each associated with respective pilot and mains feeds extending from the circumferentially extending pilot and mains manifolds. Each injector generally has a nozzle forming the discharge orifices which discharge fuel into the combustion chamber of the combustor, a feed arm for the transport of fuel to the nozzle, and a head at the outside of the combustor at which the pilot and mains feeds enter the feed arm. Within the injectors, a check valve, known as a flow scheduling valve (FSV), is typically associated with at least the mains feed in order to retain a primed manifold when de-staged and at shut-down. The FSVs also prevent fuel flow into the injector nozzle when the supply pressure is less than the cracking pressure (i.e. less than a given difference between manifold pressure and combustor gas pressure).

Multi-stage combustors may have further stages and/or manifolds. For example, the pilot manifold may be split into two manifolds for lean blow-out prevention during rapid engine decelerations.

During pilot-only operation, the splitting unit directs fuel for burning flows only through the pilot fuel circuit (i.e. pilot manifold and feeds). It is therefore conventional to control temperatures in the mains fuel circuit to prevent coking due to heat pick up from the hot engine casing. One known approach, for example, is to provide a separate recirculation manifold which is used to keep the fuel in the mains manifold cool when it is deselected. It does this by keeping the fuel in the mains manifold moving, although a cooling flow also has to be maintained in the recirculation manifold during mains operation to avoid coking.

SUMMARY

Figure 1:
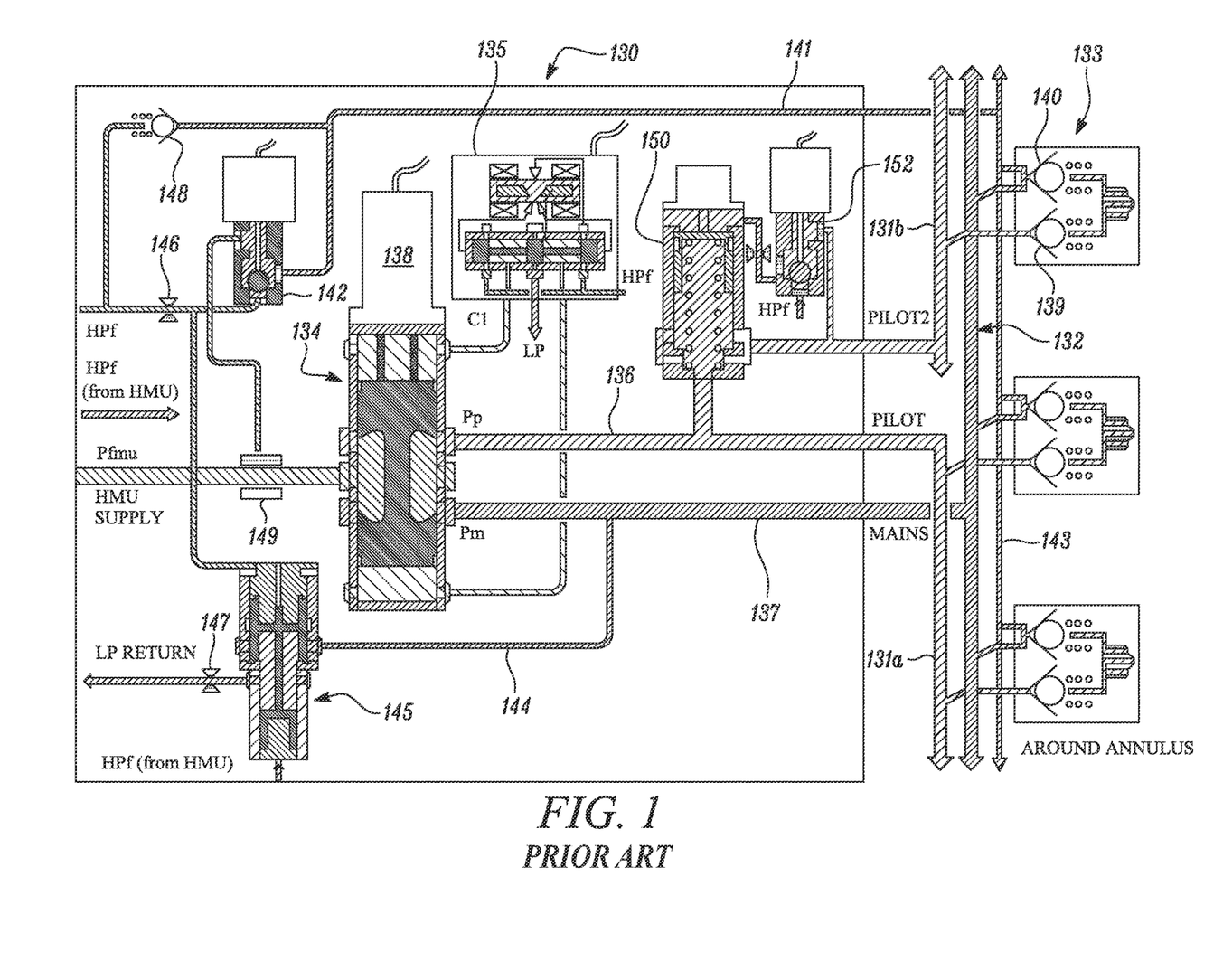
FIG. 1 shows schematically a conventional combustion staging system for a gas turbine engine in pilot and mains operation mode.

FIG. 1 shows schematically a conventional combustion staging system 130 for a gas turbine engine. A metered fuel flow arrives at the staging system at a pressure $P_{fmu}$. The staging system splits the fuel into two flows: one at a pressure $P_p$ for first 131a and second 131b pilot manifold segments of a pilot manifold and the other at a pressure $P_m$ for a mains manifold 132. Fuel injectors 133 of a combustor of the engine are split into two groups. The injectors of one group are connected to the first pilot manifold segment 131a, while the injectors of the other group are connected to the second pilot manifold segment 131b. The mains manifold feeds secondary nozzles of the fuel injectors. Pilot flow scheduling valve (FSVs) 139 and mains flow scheduling valves (FSVs) 140 at the injectors prevent combustion chamber gases entering the respective manifolds. By varying the fuel split between the manifolds, staging control of the engine can be performed.

In more detail, the staging system 130 has a splitting unit in the form of a fuel flow splitting valve (FFSV) 134, which receives the metered fuel flow from the HMU at pressure $P_{fmu}$. A spool is slidable within the FFSV under the control of a servo valve 135, the position of the spool determining the outgoing flow split between a pilot connection pipe 136 which delivers fuel to the pilot manifold segments 131a, b and a mains connection pipe 137 which delivers fuel to the mains manifold 132. The spool can be positioned so that the mains stage is deselected, with the entire metered flow going to the pilot stage. A linear variable differential transformer (LVDT) 138 provides feedback on the position of the spool to an engine electronic controller (EEC), which in turn controls staging by control of the servo valve.

Between the FFSV 134 and the second pilot manifold segment 131b, the pilot connection pipe 136 communicates with a lean blow out protection valve 150 which controls communication between the pilot connection pipe 136 and the second pilot manifold segment 131b. The lean blow out protection valve is spring biased towards an open position. A solenoid operated control valve 152 is operable to apply a control pressure to the valve member of the lean blow out protection valve to move it against the action of the spring biasing to a closed position, interrupting the communication between the pilot connection pipe 136 and the second pilot manifold segment 131b, when required. Accordingly, if there is only a pilot delivery of fuel to the engine and there is a concern that a lean blow out condition may occur, the lean blow out protection valve 150 can be closed by appropriate control of the solenoid operated control valve 152, with the result that fuel delivery to the second pilot manifold segment 131b is restricted, whilst that to the first pilot manifold segment 131a is increased. Adequate pilot delivery can therefore be assured (albeit through a reduced number of the injectors 133), resulting in a reduced risk of a lean blow-out condition occurring.

The staging system 130 also has a recirculation line to provide the mains manifold 132 with a cooling flow of fuel when the mains manifold is deselected. The recirculation line has a delivery section including a delivery pipe 141 which receives the cooling flow from a fuel recirculating control valve (FRCV) 142, and a recirculation manifold 143 into which the delivery pipe feeds the cooling flow. The recirculation manifold has feeds which introduce the cooling flow from the recirculation manifold to the mains manifold via connections to the feeds from the mains manifold to the mains FSVs 140.

In addition, the recirculation line has a return section which collects the returning cooling flow from the mains manifold 132. The return section is formed by a portion of the mains connection pipe 137 and a branch pipe 144 from the mains connection pipe, the branch pipe extending to a recirculating flow return valve (RFRV) 145 from whence the cooling flow exits the recirculation line.

The cooling flow for the recirculation line is obtained from the HMU at a pressure $HP_f$ via a cooling flow orifice 146. On leaving the RFRV 145 via a pressure raising orifice 147, the cooling flow is returned to the pumping unit for re-pressurisation by the HP pumping stage. A check valve 148 accommodates expansion of fuel trapped in the pilot and mains system during and following engine shutdown when the fuel expands due to combustor casing heat soak back. The check valve can be set to a pressure which prevents fuel boiling in the manifolds and avoids pressure increasing to the point that the mains FSVs 140 open and allow fuel into the combustor. The FRCV 142 and the RFRV 145 are operated under the control of the EEC. The HMU also supplies fuel at pressure $HP_f$ for operation of the servo valve 135, the RFRV 145, and the lean blow out protection valve 150.

When the mains is staged in, a cooling flow is also directed through the recirculation manifold 143 to avoid coking therein. More particularly a small bypass flow is extracted from the HMU's metered fuel flow at pressure $P_{fmu}$. The bypass flow is sent via a flow washed filter 149 to a separate inlet of the FRCV 142, and thence through the delivery pipe 141 to the recirculation manifold 143. The bypass flow exits the recirculation manifold to rejoin the mains fuel flow at the injectors 133.

However, in a staging system such as that shown in FIG. 1, the split between pilot and mains flow that can be achieved is limited by the size of the restriction in the FRCV 142.

More particularly, the FRCV 142 is a bi-stable valve which is either open to receive the cooling flow via the cooling flow orifice 146, or closed to receive the bypass flow at $P_{fmu}$. In pilot-only mode the FRCV 142 is open. Most of the flow into the staging system 130 from the HMU enters the FFSV 134 and is directed through the pilot manifold segments 131a, b to be expelled into the combustion chamber through the pilot fuel stages of the injectors 133. However, a proportion of the fuel from the HMU at pressure $HP_f$ enters the FRCV 142 via the cooling flow orifice 146 and is circulated through the recirculation line for cooling the mains manifold 132. In this way the mains manifold is kept "primed" with fuel.

For pilot and mains operation (shown in FIG. 1) the FRCV 142 is closed, and the mains FSVs 140 are opened to direct flow into the combustion chamber through the mains fuel stages of the injectors 133. The minimum flow through mains is the bypass flow extracted via the flow washed filter 149, this flow being determined by the flow number of the restriction in the FRCV 142. This restriction is sized to balance the need to have an adequate cooling flow through the orifice 146 in pilot-only mode and the need to have an adequate flow down the recirculation line during pilot and mains operation. Typically, at minimum flow through mains, 30% of the fuel is sent to mains and 70% to pilot. A greater split to mains, compared to pilot, is then achieved by movement of the FFSV 134 to couple the HMU supply to the pilot manifold segments 131a, b and the mains manifold 132.

US 2017/0298840 A1 proposes a different combustion staging system in which the splitting unit is configured to divert a portion of the mains flow into the delivery section via the delivery pipe during pilot and mains operation, the diverted portion re-joining the rest of the mains flow in the mains fuel stages of the injectors. Thus, in contrast to the system shown in FIG. 1, the minimum flow through mains during pilot and mains operation does not have to be determined by a restriction in the fuel recirculating control valve, this valve having a shut off position which prevents the cooling flow entering the delivery section through it during pilot and mains operation. Rather, the minimum flow through mains can be determined by the configuration of the splitting unit, allowing a smaller minimum flow through mains to be achieved. Advantageously, the diverted portion of the mains flow can still keep the recirculation line primed with relatively cool fuel, thereby preventing coking in the line.

However, in this system, the mains FSVs located at the head of each injector are still active valves i.e. they are not binary (fully closed/fully open). A failed open mains FSVs when in mains staging mode of operation can cause a gross maldistribution of flow between the combustion sectors, potentially leading to local overheating of the turbine. Thus, a complex arrangement of thermocouples may be required to determine turbine gas temperatures and reduce the impact of a failure on turbine life.

In addition, having active valves at the burner heads can result in general burner-to-burner maldistribution even when the valves are operating correctly. Valve tolerances and friction levels (which may well vary over life due to fuel breakdown effects) will result in each valve assuming a slightly different position.

To address such issue, US 2018/0372322 A1 proposes a combustion staging system in which the mains injector head valves (Staging Shut Off Valves—SSOVs) are not active valves. Rather they are operate in a binary sense, and are either open or closed. This ensures that when mains is selected, the valves are fully open providing little restriction to flow so that they cannot cause a maldistribution of mains flow between the injectors. Also, if one SSOV fails fully open, this will not cause a maldistribution between injectors when operating in mains-on mode as "fully open" is the required position.

The SSOVs are servo actuated either by an electrically driven servo staging pump or by a servo motor driving a servo pump with the motor being controlled with flow from an associated servo valve, as discussed in US 2018/0372321 A1. In mains-on mode, the pump delivery in the servo manifold is pressurised by returning it to the mains delivery manifold via a back pressure orifice. The high servo pressure is used to drive the SSOVs open. This generates a high force to open the valves, reducing the risk of a failed closed valve. Similarly, the return spring force is high in order to provide a high closing force and to ensure a drip tight seal, whereby the risk of a valve failing open when reverting to pilots-only mode is reduced.

Separately, instead of a splitting valve, the splitting unit takes the form of a staging metering valve (SMV), which meters the mains flow, combined with a staging spill valve (SSV), which sets a constant pressure drop across the SMV metering profile whilst spilling the non-mains burner flow to pilots.

However, the system proposed in US 2018/0372322 A1 is still complex and has a high component count; leading to concerns about mass, reliability and installation space. In particular, there are multiple delivery lines/manifolds (Pilots 1, Pilots2, Mains, Servo) and multiple valves/sensors such as a mains throttle valve (MTV) which raises the pressure in the mains line to ensure that the full range of pilot/mains splits can be achieved, and a cooling non return valve (CNRV) in series with a mains cooling valve (MCV) which has porting that can be connected to return lines from the Mains and Servo manifolds.

In addition, the system retains dedicated lean blow out protection components, the failure of which can lead to loss of thrust control.

Also, a CNRV position sensor can provide limited fault diagnosis capability by identifying a leaking SSOV, but a complex arrangement of thermocouples may still be required to determine which SSOV has failed, as fitting a dedicated position sensor on each SSOV would likely be impractical.

It would be desirable to provide a combustion staging system which can provide some or all of: a simpler architecture, a reduced overall part count, improved fault detection and accommodation, avoidance of dedicated lean blow out protection components, and reduction in the impact of component failure on engine operability and availability.

According to a first aspect there is provided a combustion staging system for fuel injectors of a multi-stage combustor of a gas turbine engine, the system including:

plural fuel injectors, each having respective pilot and mains injection stages;

a splitting unit which, to perform staging control of the combustor, receives a metered fuel flow and, for pilot and mains operation, controllably splits the received fuel flow into a pilot flow for injecting at the pilot stages of the injectors and a mains flow for injecting at the mains stages of the injectors, and for pilot-only operation, controllably splits the received fuel flow into a first part of the pilot flow for injecting at the pilot stages of a first portion of the injectors and a second part of the pilot flow for injecting at the pilot stages of a second portion of the injectors; and pilot and mains fuel manifolds distributing respective fuel flows from the splitting unit to the injectors;

wherein each of the fuel injectors has a respective first solenoid valve which is movable between (i) a pilot-only operation position which shuts off the mains fuel manifold from the injector's mains stage, and (ii) a pilot and mains operation position which opens a path from the mains fuel manifold to the injector's mains stage;

wherein the system further includes additional solenoid valve means configured such that (i) for each injector of the first portion of the fuel injectors during pilot-only operation the pilot fuel manifold is shut off from the injector's pilot stage, and a path is opened from the mains fuel manifold to the injector's pilot stage, and (ii) for each injector of the first portion of the fuel injectors during pilot and mains operation a path is opened from the pilot fuel manifold to the injector's pilot stage, and the mains fuel manifold is shut off from the injector's pilot stage;

wherein each injector of the second portion of the fuel injectors has a path from the pilot fuel manifold to the injector's pilot stage; and wherein the splitting unit is operable to direct the first part of the pilot flow into the mains fuel manifold and the second part of the pilot flow into the pilot fuel manifold for pilot-only operation, and is operable to direct the pilot flow into the pilot fuel manifold and the mains flow into the mains fuel manifold for pilot and mains operation.

Advantageously, each first solenoid valve can be actuated directly by an electrically powered two-way solenoid, maintaining the benefits of the SSOVs described above in relation to US 2018/0372322 A1, such as a binary operating mode. However, the servo system of US 2018/0372322 A1 can be avoided, with adequate force margins to open/close each first solenoid valve being provided by the solenoid and its spring. Thus the overall number of delivery/recirculation/servo pipes can be reduced. Although additional wiring is required for the first solenoid valve, it is generally easier to route wiring harnesses than pipes.

Indeed, more generally, the overall hydro-mechanical parts count can be reduced, with no need for components associated with recirculation of fuel from mains to pilot in the staging unit, CNRV or MCV.

Also, improved fault detection may be possible without the need for additional sensors, for example using the inherent characteristics of the first solenoid valves to provide a measure of valve position and thereby also avoiding additional sensors. In particular, solenoid plunger and hence valve position can be inferred from changes in coil inductance, assisting with fault diagnosis by pinpointing failure of an individual first solenoid valve.

Turning to fault accommodation, since each first solenoid valve can be individually controlled, the likelihood of a single failure causing all the valves to fail to an incorrect state is reduced, e.g. relative to the US 2018/0372322 A1 system where all the SSOVs are actuated by a single servo system which is thus a potential single point failure location that can prevent dispatch. Thus, it may be possible to accommodate the failure of one or more individual first solenoid valves reducing disruption to customers. For example, in pilot and mains operation, if one valve fails closed, it may be possible to close some of the other valves around the engine to maintain symmetry of flow distribution, thereby avoiding damage to the turbine and still allowing engine dispatch. Similarly, in pilots-only operation, if one valve fails open, it may be acceptable to switch off the first part of the pilot flow into the mains fuel manifold at the splitting unit.

In addition, the capability to control each first solenoid valve independently provides the flexibility to direct mains flow to only some of the mains stages. This is known as circumferential staging and may be beneficial at some parts of a flight envelope where only a very low mains flow is required for combustion. If all the mains stages are operating at such low flows, the flow at each individual stage may be such that the mains injector passageways become only partially full of fuel, increasing a risk of injector coking and causing a problem that the fuel film projected by the injector nozzle may not be in a best form for efficient dispersion into the combustor.

According to a second aspect there is provided a gas turbine engine for an aircraft comprising: a multi-stage combustor, and the combustion staging system for fuel injectors of the multi-stage combustor according to the first aspect.

Optional features of the present disclosure will now be set out. Except as indicated, these are applicable singly or in any combination with any aspect of the present disclosure.

According to one option, the additional solenoid valve means may be implemented in the form of additional functionality of certain of the first solenoid valves such that the first solenoid valve of each injector of the first portion of the fuel injectors is a four-way solenoid valve which is movable between (i) the pilot-only operation position which shuts off the pilot fuel manifold from the injector's pilot stage, opens a path from the mains fuel manifold to the injector's pilot stage, and shuts off the mains fuel manifold from the injector's mains stage, and (ii) the pilot and mains operation position which opens a path from the pilot fuel manifold to the injector's pilot stage, shuts off the mains fuel manifold from the injector's pilot stage, and opens the path from the mains fuel manifold to the injector's mains. In this case, each of the first solenoid valves of the second portion of the fuel injectors may be a two-way solenoid valve.

Advantageously, this option allows the number of pipes extending between the splitting unit and the fuel manifolds to be reduced to just two, e.g. a delivery pipe to the pilot fuel manifold and another delivery pipe to the mains fuel manifold.

According to another option, the additional solenoid valve means may be implemented as a three-way second solenoid valve. In this case, the system may further include a subsidiary fuel manifold which distributes a respective fuel flow from the three-way second solenoid valve to the first portion of the injectors, and each injector of the first portion of the fuel injectors may have a path from the subsidiary fuel manifold to the injector's pilot stage, the three-way second solenoid valve being movable between (i) a pilot-only operation position which shuts off the pilot fuel manifold from the subsidiary fuel manifold and thereby shuts off the pilot fuel manifold from the pilot stages of the first portion of the injectors, and opens a path from the mains fuel manifold to the subsidiary fuel manifold and thereby opens paths from the mains fuel manifold to the pilot stages of the first portion of the injectors, and (ii) a pilot and mains operation position which opens a path from the pilot fuel manifold to the subsidiary fuel manifold and thereby opens paths from the pilot fuel manifold to the pilot stages of the first portion of the injectors, and shuts off the mains fuel manifold from the subsidiary fuel manifold and thereby shuts off the mains fuel manifold from the pilot stages of the first portion of the injectors. In addition, each of the first solenoid valves may be a two-way solenoid valve.

According to yet another option, the additional solenoid valve means may be implemented in each injector of the first portion of the fuel injectors as a respective three-way second solenoid valve which is movable between (i) a pilot-only operation position which shuts off the pilot fuel manifold from the injector's pilot stage, and opens a path from the mains fuel manifold to the injector's pilot stage, and (ii) a pilot and mains operation position which opens a path from the pilot fuel manifold to the injector's pilot stage, and shuts off the mains fuel manifold from the injector's pilot stage. In this case, each of the first solenoid valves may be a two-way solenoid valve. Again, this option allows the number of pipes extending between the splitting unit and the fuel manifolds to be reduced to just two, The combustion staging system may further include a flow measuring device (such as a flow measuring valve) measuring the fuel flow sent from the splitting unit to the mains fuel manifold, and the measured fuel flow being used by the splitting unit to control the splitting of the received fuel flow.

Typically, the splitting unit is operable to vary the relative sizes of the pilot flow and the mains flow in pilot and mains operation. However, the splitting unit may be operable to vary the relative sizes of the first and second parts of the pilot flow in pilot-only operation. Thus, for example, the system can provide lean blow out functionality without a need for separate, dedicated equipment such as the lean blow out protection valve 150 shown in FIG. 1.

The first solenoid valves may be operable to perform circumferential staging of the mains stages of the injectors.

The combustion staging system may further include a computer controller, such as an EEC, programmed to control the operation of the system, e.g. to control the operation of the splitting unit, to control the position of the first solenoid valves, and to control the position of the additional solenoid valve arrangement. When the combustion staging system has the flow measuring device, the computer controller can receive the measured fuel flow, and operate the splitting unit to control the splitting of the received fuel flow based on the measured fuel flow. The computer controller can control the first solenoid valves to perform the above-mentioned circumferential staging.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein.

In any gas turbine engine as described and/or claimed herein, the combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

According to an aspect, there is provided an aircraft comprising a gas turbine engine as described and/or claimed herein. The aircraft according to this aspect is the aircraft for which the gas turbine engine has been designed to be attached.

According to an aspect, there is provided a method of operating a gas turbine engine as described and/or claimed herein.

According to an aspect, there is provided a method of operating an aircraft comprising a gas turbine engine as described and/or claimed herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 2:
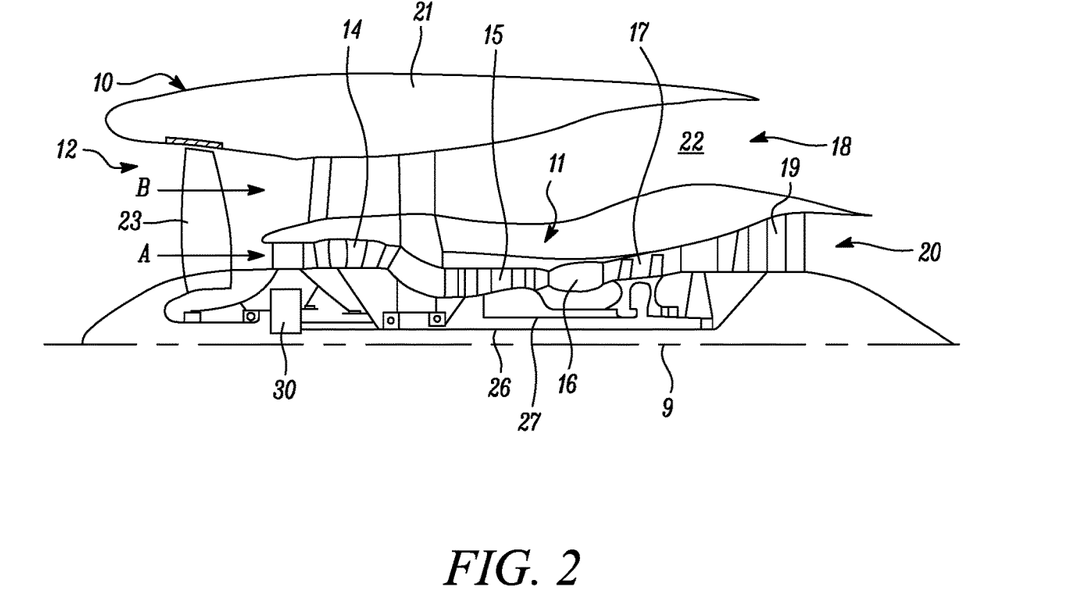
FIG. 2 is a sectional side view of a gas turbine engine.

FIG. 2 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, staged combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 3:
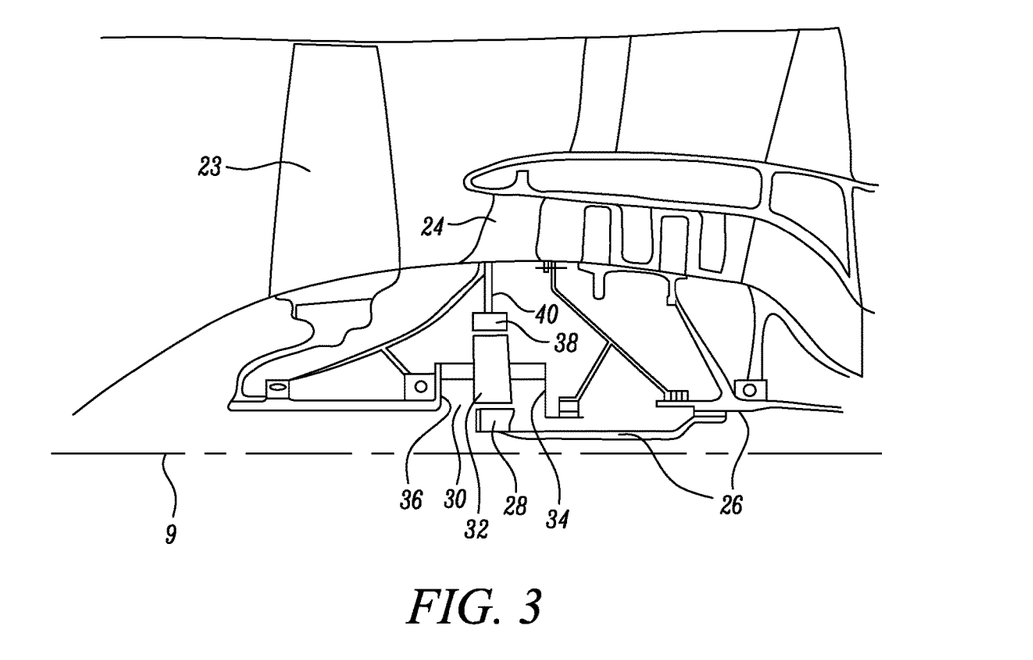
FIG. 3 is a close up sectional side view of an upstream portion of a gas turbine engine.

An exemplary arrangement for a geared fan gas turbine engine 10 is shown in FIG. 3. The low pressure turbine 19 (see FIG. 2) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 4:
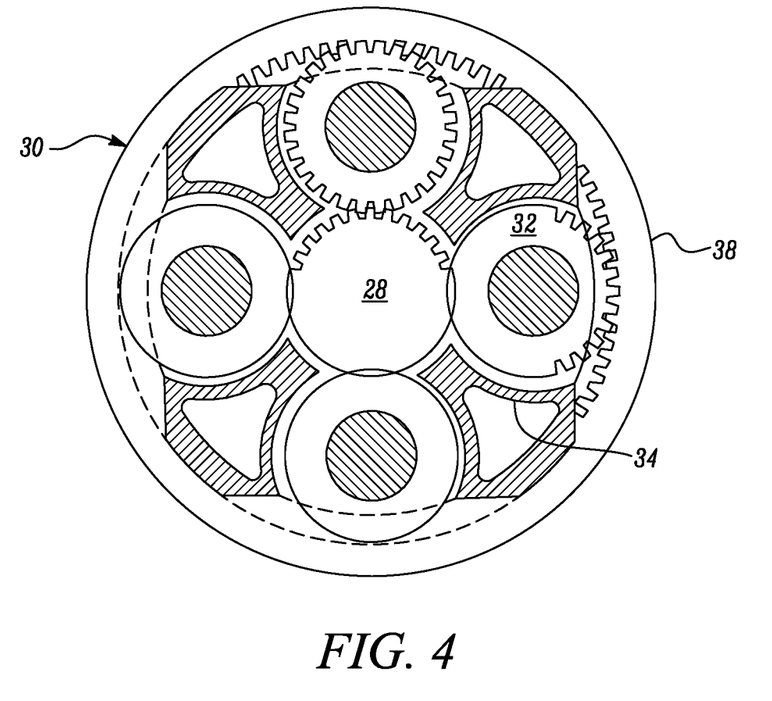
FIG. 4 is a partially cut-away view of a gearbox for a gas turbine engine.

The epicyclic gearbox 30 is shown by way of example in greater detail in FIG. 4. Each of the sun gear 28, planet gears 32 and ring gear 38 comprise teeth about their periphery to intermesh with the other gears. However, for clarity only exemplary portions of the teeth are illustrated in FIG. 4. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 3 and 4 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 3 and 4 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 3 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 3. For example, where the gearbox 30 has a star arrangement (described above), the skilled person would readily understand that the arrangement of output and support linkages and bearing locations would typically be different to that shown by way of example in FIG. 3.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 2 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 2), and a circumferential direction (perpendicular to the page in the FIG. 2 view). The axial, radial and circumferential directions are mutually perpendicular.

The engine 10 has a pumping unit comprising a low pressure (LP) pumping stage which draws fuel from a fuel tank of the aircraft and supplies the fuel at boosted pressure to the inlet of a high pressure (HP) pumping stage. The LP stage typically comprises a centrifugal impeller pump while the HP pumping stage may comprise one or more positive displacement pumps, e.g. in the form of twin pinion gear pumps. The LP and HP stages are typically connected to a common drive input, which is driven by one of the engine shafts 26, 27 via an engine accessory gearbox.

A fuel supply system then accepts fuel from the HP pumping stage for feeding to the staged combustor 16 of the engine 10. This system has a hydro-mechanical unit (HMU) comprising a fuel metering valve operable to control the rate at which fuel is allowed to flow to the combustor. The HMU further typically comprises: a pressure drop control arrangement (such as a spill valve and pressure drop control valve) which is operable to maintain a substantially constant pressure drop across the metering valve, and a pressure raising and shut-off valve at the fuel exit of the HMU which ensures that a predetermined minimum pressure level is maintained upstream thereof for correct operation of any fuel pressure operated auxiliary devices (such as variable inlet guide vane of variable stator vane actuators) that receive fuel under pressure from the HMU. Further details of such an HMU are described in EP 2339147 A.

Figure 5A:
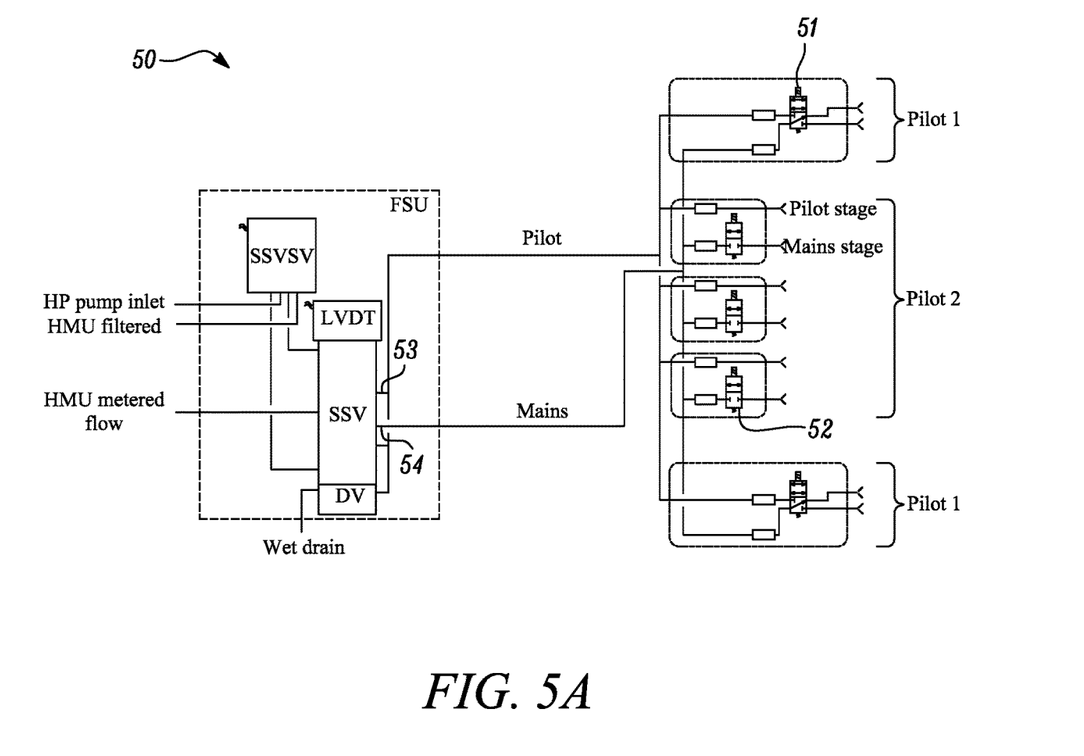
FIG. 5A shows schematically a combustion staging system, in pilot-only operation mode.
Figure 5B:
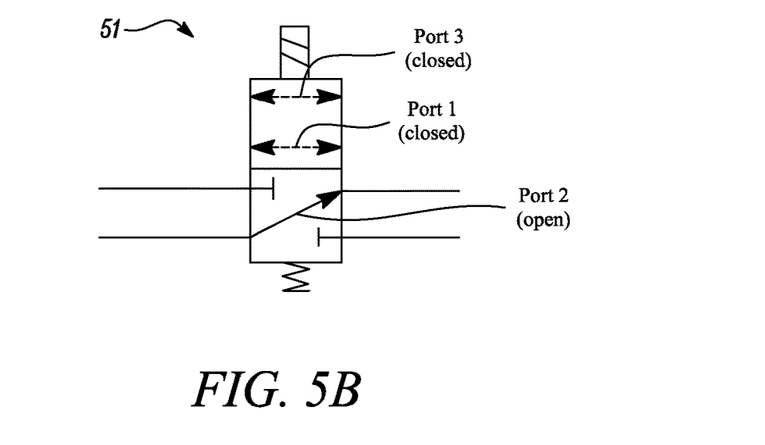
FIG. 5B shows schematically an enlarged view of a four-way solenoid valve, in the pilot-only operation mode, of a first portion of fuel injectors of the combustion staging system.
Figure 6A:
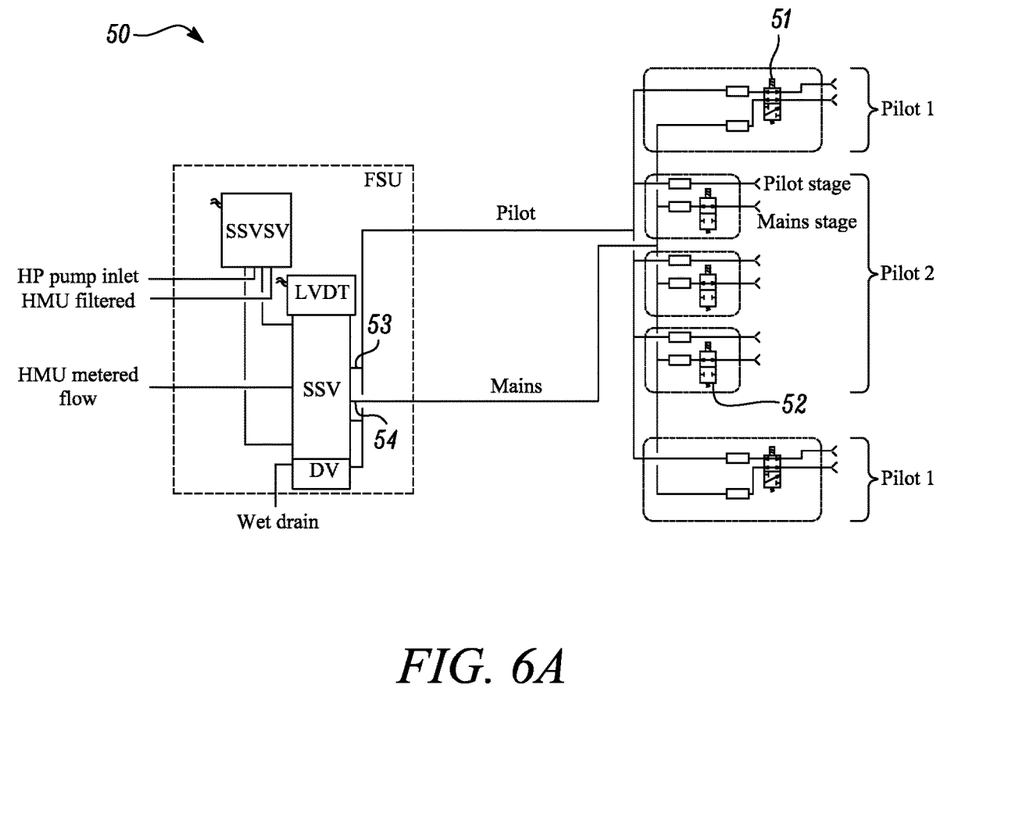
FIG. 6A shows schematically the combustion staging system, in pilot and mains operation mode.
Figure 6B:
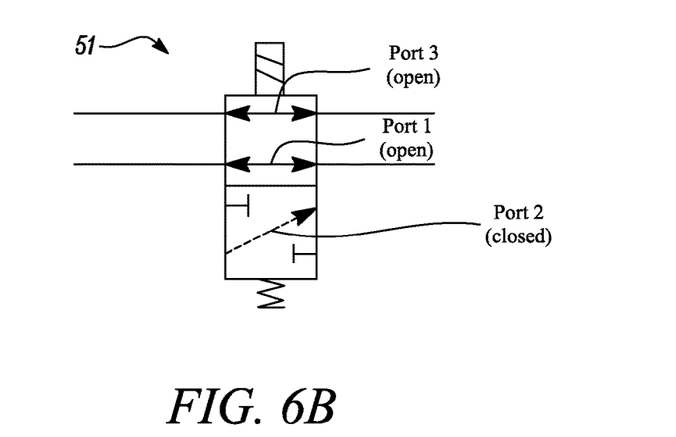
FIG. 6B shows schematically an enlarged view of the four-way solenoid valve, in the pilot and mains operation mode; of the first portion of fuel injectors of the combustion staging system.

An electronic controller (EEC) commands the HMU fuel metering valve to supply fuel to the combustor at a given flow rate. The metered fuel flow leaves the HMU and arrives at a staging system 50, shown schematically in FIG. 5A in pilot-only operation mode and in FIG. 6A in pilot and mains operation mode. FIGS. 5B and 6B show schematically enlarged views of four-way solenoid valves (discussed below) of a first (Pilots 1) portion of the fuel injectors for respectively the pilot-only operation mode and the mains operation mode. Each of these valves has three large flow number ports (Port 1, Port 2 and Port 3, discussed below) which produce negligible pressure drops in the flows passing therethrough.

The staged combustor 16 has a pilot, or primary, flame and a main, or secondary, flame. The pilot/primary flame is fuelled for all low power operating conditions, to ensure that the combustor stays lit, whilst the pilot/primary flame and main/secondary flame are both fuelled at high power operating conditions. Such a staged combustion fuelling arrangement reduces NOx and smoke emissions.

The staging system 50 differs over the earlier systems proposed by US 2017/0298840 A1 and US 2018/0372322 A1 by using solenoid operated valves at the injector heads, the solenoid valves replacing the passive or servo actuated valves used in the earlier systems. This facilitates two architectural simplifications:

Deletion of dedicated lean blow-out (LBO) valves, whilst enhancing LBO protection capability by providing variable LBO split control rather than the fixed LBO split control offered by the earlier systems, and Deletion of (i) cooling/recirculation/servo lines between the fuel splitting unit (FSU) and injectors and (ii) any associated valves/electrical interface devices (EIDs) whilst maintaining a mains line cooling flow during pilot only operation for thermal management.

In pilots-only mode (FIGS. 5A and 5B) the mains flow is switched off at injector solenoid valves (discussed below) but the mains fuel manifold (Mains) remains primed and passes a cooling flow to prevent fuel heating and subsequent breakdown. In pilot and mains mode (FIGS. 6A and 6B) the pilots and mains flows are delivered to the respective stages of the injectors through respectively the pilot fuel manifold (Pilot) and mains fuel manifold.

more detail, the FSU has a staging splitter valve (SSV) which receives the metered fuel flow from the HMU and controls the pilot/mains flow split. The position of the SSV is controlled via a two stage servo valve (SSVSV) or other suitable device (e.g. a direct drive motor) with position feedback provided by a linear variable differential transformer (LVDT) or other suitable device. A manifold drains valve (DV) is activated by the SSV piston at engine shut down to drain both the pilot and mains fuel manifolds. The FSU is similar to the staging unit described in US 2017/0298840 A1, but an alternative is to implement a staging unit based on a staging metering valve and a staging spill valve as described in US 2018/0372322 A1.

The injectors are divided into two groups. A first portion (e.g. numbering two) of the injectors (Pilot 1) each has a four-way, two-position solenoid valve 51 which controls the fuel flows from the pilot and mains fuel manifolds to its pilot and mains stages, while a second portion (all the others, e.g. numbering 16 in an 18 injector combustor) of the injectors (Pilot 2) each has a two-way, two-position solenoid valve 52 which controls the fuel flow from the mains fuel manifold to its mains stage, and has a separate path from the pilot fuel manifold to its pilot stage. Each injector also has respective weight distributing valves (WDVs) between each manifold and each of its stages to improve injector head-to-head fuel distribution by compensating for head effects due to the height of each injector on the engine.

In pilot-only mode (FIGS. 5A and 5B), all the injector solenoid valves 51, 52 are de-energised (this is also the fail-safe state in the event of a loss of power) to close a port connecting the mains fuel manifold and the nozzle of the mains stage at each injector. Thus, flow to the mains stage nozzles is switched off. The solenoid valves can incorporate a drip-tight seal if a small leakage to the mains stages is unacceptable.

The SSV has two variable metering ports, namely a Pilots 2 port 53 and a Mains/Pilots 1 port 54, depending on operating mode. The SSV is positioned by applying current to the SSVSV, causing its first stage flapper to deflect. This in turn causes its second stage spool to move to port servo flow to/from either end of the SSV so that the SSV piston is displaced to open/close the metering ports. Closed loop position control is achieved via the EEC with position feedback being provided by the LVDT. Servo supply to the SSVSV is from the HP pumping stage outlet, filtered at the HMU, with servo return to the HP pumping stage inlet.

For a normal, even distribution of the total pilot flow between all the Pilot 1 and Pilot 2 injectors, the SSV is positioned so that both its metering ports set a negligible restriction to flow, the split between the individual injectors being predominantly determined by the injector pilot stage nozzle restrictions. A first part of the total pilot flow passes from the Mains/Pilots 1 port 54 through the mains fuel manifold and mains WDVs of the Pilot 1 injectors to the Pilot 1 injector four-way solenoid valves 51. At each of these valves 51, the flow then passes through Port 2 which is open with the solenoid plunger in its pilot-only position before passing to the Pilot 1 pilot stage nozzle i.e. the first part of the total pilot flow passes through the mains fuel manifold and the Pilot 1 solenoid valves 51 to provide a mains line cooling flow and to avoid stagnant regions where the fuel could degrade at temperature. In this state, each four-way solenoid valve 51 also disconnects the pilot fuel manifold from its Pilot 1 pilot stage nozzle (Port 3 closed). In addition, the two-way solenoid valves 52 are in a pilot-only position which disconnects the mains fuel manifold from the Pilot 2 mains stage nozzles. Meanwhile, a second part of the total pilot flow passes from the Pilots 2 port 53 in the SSV, through the pilot fuel manifold directly to the pilot WDVs and pilot stage nozzles of the Pilot 2 injectors. Both the first and second parts of the pilot flow are continuous to the injectors.

Thus the SSV acts as a Pilot 1/Pilot 2 split control valve in pilot-only operation, the four-way solenoid valves 51 being used to connect/disconnect the relevant flow paths to enable this. It follows that the SSV can control a variable LBO split as required (which is an enhancement over the fixed LBO split offered by earlier systems) to maintain a pilot flame at the Pilot 1 injectors at low flow conditions i.e. the SSV can be moved to restrict pilot flow to the Pilots 2 injectors, closing the Pilots 2 port 53 whilst simultaneously opening the Mains/Pilots 1 port 54 so that the Pilot 1 injector pilot stage nozzles are preferentially fuelled.

In pilot and mains mode (FIGS. 6A and 6B), all of the injector solenoid valves 51, 52 are energised to open a large flow number port (Port 1 of each valve 51) connecting the mains fuel manifold and the mains stage nozzle at each injector.

The SSV now acts as a pilot/mains splitter, the four-way solenoid valves 51 facilitating this by disconnecting the mains fuel manifold from the Pilot 1 injector pilot stage nozzles (Port 2 closed). Each of these nozzles is fed instead from the pilots fuel manifold via the opened Port 3 of the respective four-way solenoid valve 51.

SSV position is controlled to set the required pilot/mains split by moving the piston as previously described to vary the ratio of the two metering ports 53, 54. Total mains flow passes from the Mains/Pilots 1 port 54 of the SSV, through the mains fuel manifold, to each injector. There it passes through the respective WDV and open mains port of the solenoid valves 51, 52 (sized to provide negligible restriction) to the injector mains stage nozzle. Thus, the total mains flow is evenly distributed between the injectors.

The total pilot flow passes from the Pilots 2 port 53 of the SSV, through the pilot fuel manifold to each injector. At each Pilot 2 injector, the flow passes through the respective WDV and then directly to the injector pilot stage nozzle. At each Pilot 1 injector, the flow passes through the respective WDV and then through the opened Port 3 on the four-way solenoid valve 51 to the injector pilot stage nozzle. Since this port is sized to provide negligible restriction to flow, a substantially even distribution of total pilots flow between all the injectors is achieved i.e. all injectors (both Pilots 1 and Pilots 2) are fed from the pilot fuel manifold and the level of flow is the same at each injector since the nozzle restrictions are dominant. Again, the pilot flow to all injectors is continuous.

The continuous flow through the pilot and mains fuel manifolds, associated lines and injector passageways ensures adequate cooling during pilot and mains operation, avoiding stagnant regions of fuel.

Transiently, as the four-way solenoid valves 51 move between staging states, a continuous flow to their pilot stage nozzles is maintained. These nozzles are fed from both the mains and pilot fuel manifolds as the solenoid plungers move until an end stop is reached, closing off either Port 2 or Port 3 to switch off a connection to one of the two manifolds.

the staging system 50 can provide LBO capability without dedicated LBO valves. Only one solenoid valve 51, 52 is needed per injector, so that although the four-way solenoid valves 51 at the Pilot 1 injectors are more complex than the two-way solenoid valves at the Pilot 2 injectors, they do not increase the overall parts count. In addition, in pilot-only operation, the LBO split (i.e. the ratio of the first and second parts of the total pilot flow) can be varied by the SSV. This offers additional functionality and potential operability benefits over the previous systems which operate a fixed LBO split. The SSV position control can provide accurate control of the LBO split.

Such control may be further improved by the addition of a flow sensing valve (not shown in FIGS. 5 and 6) downstream of the SSV in the delivery line between the Mains/Pilots 1 port 54 and the mains fuel manifold to provide a measurement signal for the first part of the total pilot flow in pilot-only operation. Indeed, such a flow sensing valve may also be used to control/limit any mains flow through one or more failed open solenoid valves 51, 52, i.e. in pilot and mains mode, it can be used to provide an accurate measurement of the mains flow. Thus in both operating modes, the flow sensing valve signal can be used to fine tune the flow split, using the SSV to make adjustments. Having a measure of one of the two flows out of the SSV helps ensure that the flow split is unaffected by any changes in downstream restrictions with time.

Moreover, the configuration of the four-way solenoid valves 51 allows the mains flow to be switched on/off at the injectors and simultaneously, allows switching of the functionality of the SSV. This now has two modes of operation: in pilot and mains mode it sets the pilot/main flow split, while in pilot-only mode it sets the LBO split with the first part of the pilot flow passing through the mains fuel manifold to cool it and to avoid stagnant regions. This therefore allows the staging system 50 to operate without recirculation/servo/cooling lines and associated valves/EIDs. In particular, the solenoid valves 51, 52 are electrically actuated so there is no requirement for them to have a servo control system, and the mains cooling flow is provided by the first part of the pilot flow in pilot-only only mode, thereby eliminating a need for recirculation lines to carry flow from the fuel manifolds back to the FSU.

More generally, using the mains fuel manifold to deliver the first part of the pilot flow when operating in pilot-only mode enables a reduction in the overall number of delivery/recirculation/servo pipes between the FSU and injectors. In particular only two fuel manifolds are needed, and no recirculation or servo pipes. This offers significant installation benefits in terms of reduced space, mass and cost, although it is offset to an extent by the additional wiring required for the solenoid valves 51, 52, and the additional electrical hardware required for power generation, conditioning and solenoid drives.

With the FSU simplified to comprise essentially two valves (the SSVSV and the SSV), there is potential for the FSU to be integrated with the HMU, thus deleting the FSU as a separately installable component. This also offers significant space, mass and cost benefits. It can also remove a need for the SSVSV supply and return pressures to bypass the HMU shut-off valve to the FSU, removing a potential leakage path to the injectors at shut down.

In addition, the capability to independently control the two-way solenoid valves 52 provides the flexibility to implement circumferential staging by directing mains flow to only some of the mains stages of the Pilots 2 injectors.

Figure 7:
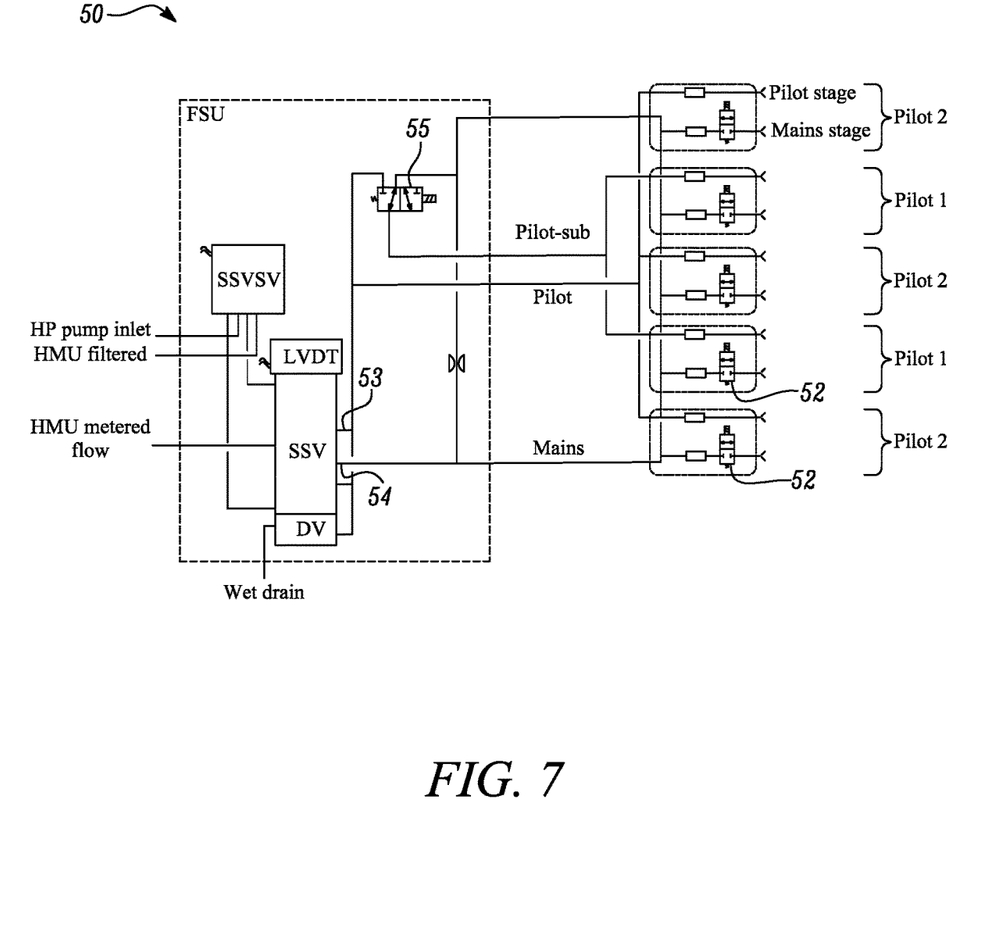
FIG. 7 shows schematically a variant combustion staging system, in pilot-only operation mode.

FIG. 7 shows schematically a variant staging system 50 in pilot-only operation mode. In FIG. 7, features which are similar or identical to those in the staging system of FIGS. 5 and 6 have the same reference numbers and acronyms. In this variant, the routing of the first part of the total pilot flow to the Pilots 1 injectors in pilot-only mode is achieved by a three-way/two position solenoid valve 55 within the FSU rather than by four-way solenoid valves at the Pilot 1 injectors.

The Pilots 1 and Pilots 2 injectors each have a two-way, two-position solenoid valve 52 which controls the fuel flow from the mains fuel manifold (Mains) to its mains stage. In addition, each of the Pilots 2 injectors has a separate path from the pilot fuel manifold (Pilot) to its pilot stage, while each of the Pilots 1 injectors also has a separate path but in this case from a subsidiary fuel manifold (Pilot-sub) which distributes fuel flow from the three-way/two position solenoid valve 55 to the Pilots 1 injectors.

In the pilot-only operation mode shown in FIG. 7, the injector head solenoid valves 52 are closed, and the three-way solenoid valve 55 is de-powered (a spring within the three-way valve providing the mechanical bias to load the hydraulic valve assembly into the desired position) to open a path from the mains fuel manifold to the subsidiary fuel manifold, while shutting off the pilot fuel manifold from the subsidiary fuel manifold. The first part of the total pilot flow from the Mains/Pilots 1 port 54 in the SSV thus passes through the mains fuel manifold, the three-way solenoid valve 55 and the subsidiary fuel manifold to the pilot stage nozzles of the Pilot 1 injectors. This provides a mains line cooling flow and avoids stagnant regions. Meanwhile, the second part of the total pilot flow passes from the Pilots 2 port 53 in the SSV, through the pilot fuel manifold directly to the pilot stage nozzles of the Pilot 2 injectors.

As in the staging system of FIGS. 5 and 6, the position of the SSV controls the LBO split of flow between the Pilots 1 and Pilots 2 injectors. In this way, an equal flow to each pilot stage nozzle can be achieved, or the flow to each nozzle of the Pilots 1 injectors can be increased to a higher level than the flow to each nozzle of the Pilots 2 injectors to avoid weak extinction of the pilots flame at the Pilots 1 injectors.

In pilot and mains mode, the three-way solenoid valve 55 is powered to overcome the spring load in the valve and push the valve to open a path from the pilot fuel manifold to the subsidiary fuel manifold, while shutting off the mains fuel manifold from the subsidiary fuel manifold. The two-way solenoid valves 52 at the injectors are also powered to allow mains flow to pass to the mains stage nozzles. Flow to each Pilots 1 and Pilots 2 injector is equalised at this condition. The pilots to mains flow split is controlled by the SSV position. Again, a flow sensing valve (not shown in FIG. 7) may be located downstream of the SSV in the delivery line between the Mains/Pilots 1 port 54 and the mains fuel manifold to provide measurement signals for the first part of the total pilot flow in pilot-only operation, and for the mains flow in pilot and mains operation.

The variant staging system 50 of FIG. 7 requires drainage of the pilot, mains and subsidiary fuel manifolds after engine shutdown, to prevent egress of fuel from the manifolds into the combustor. This can be effected by activated the SSV piston to open the DV and thence make a connection between the pilot and mains fuel manifolds and the wet drain, in addition to powering one or more of the two-way solenoid valves 52 to open. The three-way solenoid valve 55 can either be powered or de-powered during this phase. Powering it will allow the subsidiary fuel manifold to drain via the mains manifold, while de-powering it will allow the subsidiary fuel manifold drain via the pilot fuel manifold.

Relative to the staging system of FIGS. 5 and 6, the variant staging system 50 of FIG. 7 has certain benefits, such as:

Common two-way solenoid valves 52 can be used at all the injectors, reducing overhead for parts management and reducing a possibility of fitting the wrong valve at a given injector.

The two-way, two-position solenoid valves 52 are simpler than the four-way, two-position solenoid valves 51, which can improve reliability.

As all the injectors have independently controllable two-way solenoid valves 52, circumferential staging can be implemented including the Pilots 1 as well as the Pilots 2 injectors.

On the other hand, the manifold layout is more complex, including a recirculation line from the mains fuel manifold back to the FSU in order to bring flow to the three-way solenoid valve 55.

Figure 8:
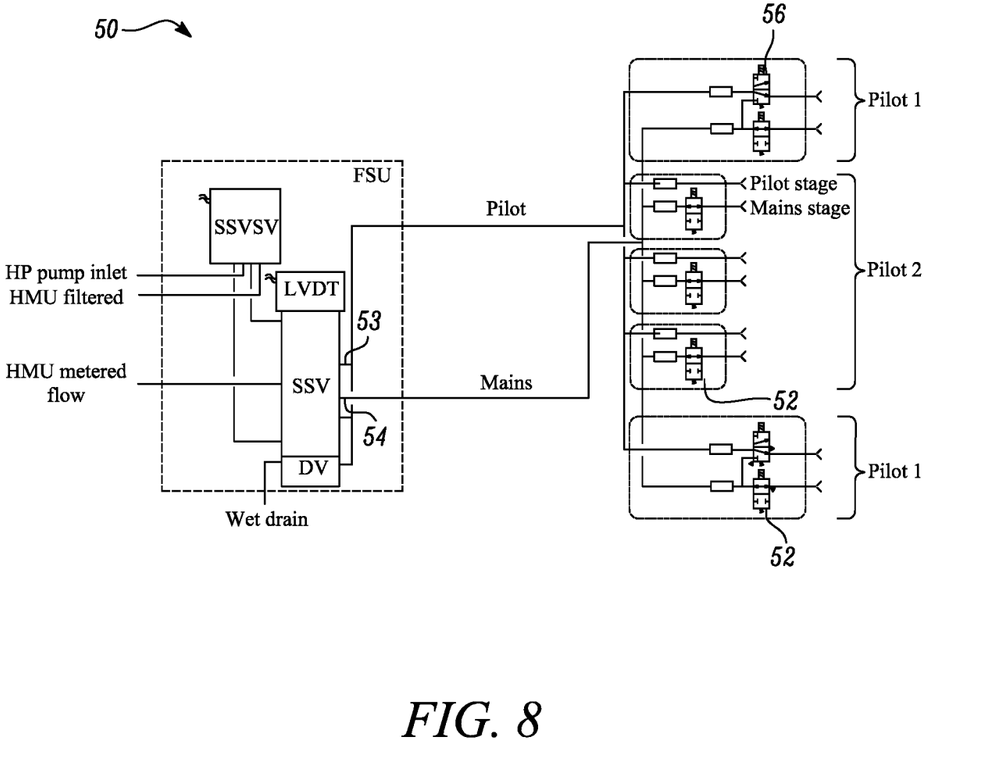
FIG. 8 shows schematically a further variant combustion staging system, in pilot and mains operation mode.

FIG. 8 shows schematically a further variant staging system 50 in pilot and mains operation mode. In FIG. 8, features which are similar or identical to those in the staging systems of FIGS. 5 and 6 and FIG. 7 have the same reference numbers and acronyms. In this further variant, relative to the system of FIGS. 5 and 6, each of the Pilots 1 injectors, instead of a four-way, two-position solenoid valve, has a three-way, two-position solenoid valve 56 which controls the fuel flows from the pilot (Pilot) and mains (Mains) fuel manifolds to its pilot stage, and a two-way, two-position solenoid valve 52 which controls the fuel flow from the mains fuel manifold to its mains stage. The Pilots 2 injectors are similar to the Pilots 2 injectors of the staging systems of FIGS. 5 and 6 and FIG. 7, each having a two-way, two-position solenoid valve 52 which controls the fuel flow from the mains fuel manifold to its mains stage, and a separate path from the pilot fuel manifold to its pilot stage.

In pilot and mains operation mode, the two-way solenoid valves 52 are powered, opening a path at each injector from the mains fuel manifold to its mains stage. The three-way solenoid valves 56 are also powered, opening a path from the pilot fuel manifold to the pilot stage of each Pilots 1 injector, and shutting off the mains fuel manifold from the pilot stage.

In pilot-only operation mode, the two-way solenoid valves 52 are de-powered, shutting off the mains fuel manifold to the mains stages. The three-way solenoid valves 56 are also de-powered, shutting off the pilots fuel manifold from the pilot stage of each Pilots 1 injector, but opening a path from the mains fuel manifold to the pilot stage.

Thus the overall functionality and architecture is similar to that of the staging system of FIGS. 5 and 6. However, the two-way solenoid valves 52 at the Pilots 1 injectors allow the mains stage of any of these injectors to be independently switched off in the event of a failure of one of its three-way solenoid valves 56, thereby helping to avoid sector over-fuelling (i.e. total pilot+mains flow fed by one injector) in those circumstances. For example, if one of the three-way solenoid valves 56 fails in pilot and mains mode to its pilot-only position, then the pilots stage of its injector receives mains flow but no pilots flow, while the mains stage of its injector also receives mains flow. At low pilot/mains flow splits, the pressure in the mains manifold will be high, resulting in a high pilots and mains flow to this injector, i.e. sector overfuelling. However, the overfuelling can be reduced by shutting off the two-way solenoid valve 52 of the injector to stop mains flow through its mains stage.

In addition, as with the staging system of FIG. 7, circumferential staging can be implemented including the Pilots 1 as well as the Pilots 2 injectors.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A combustion staging system for fuel injectors of a multi-stage combustor of a gas turbine engine, the combustion staging system including:

a plurality of the fuel injectors, each of the fuel injectors of the plurality of the fuel injectors having a respective pilot stage and a mains stage a splitting unit (FSU) which, to perform staging control of the combustor, receives a metered fuel flow and, for the pilot stage and the mains stage operation, controllably splits the metered fuel flow into a pilot flow for injecting at the pilot stage of the each of the fuel injectors and a mains flow for injecting at the mains stage of the each of the fuel injectors, and for pilot stage-only operation, controllably splits the metered fuel flow into a first part of the pilot flow for injecting at the pilot stage of a first portion (Pilot 1) of the each of the fuel injectors and a second part of the pilot flow for injecting at the pilot stage of a second portion (Pilot 2) of the each of the fuel injectors; and a pilot fuel manifold (Pilot) and a mains (Mains) fuel manifold, wherein the pilot fuel manifold and the mains fuel manifold distribute respective fuel flows from the splitting unit (FSU) to the plurality of the fuel injectors;

wherein the each of the fuel injectors has a respective first solenoid valve which is movable between (1) the pilot stage-only operation position which shuts off the mains fuel manifold from the mains stage of the plurality of the fuel injectors, and (ii) the a pilot and mains stage operation position which opens a path from the mains fuel manifold to the mains stage of the plurality of the fuel injector wherein the system further includes additional solenoid valve configured such that (1) for the first portion of the each of the fuel injectors during the pilot stage-only operation the pilot fuel manifold is shut off from the pilot stage of the plurality of the fuel injectors, and a path is opened from the mains fuel manifold to the pilot stage of the plurality of the fuel injectors, and (ii) for the first portion of the each of the fuel injectors during the pilot and mains stage operation a path is opened from the pilot fuel manifold to the pilot stage of the plurality of the fuel injectors, and the mains fuel manifold is shut off from the pilot stage of the plurality of the fuel injectors; wherein the second portion of the each of the fuel injectors has a path from the pilot fuel manifold to the pilot stage of the plurality of the fuel injectors; and wherein the splitting unit is operable to direct the first part of the pilot flow into the mains fuel manifold and the second part of the pilot flow into the pilot fuel manifold for the pilot stage-only operation, and is operable to direct the pilot flow into the pilot fuel manifold and the mains flow into the mains fuel manifold for the pilot and mains stage operation.

2. The combustion staging system of claim 1, wherein:

the first solenoid valve of the first portion of the each of the fuel injectors comprises a four-way solenoid valve which is movable between (1) the pilot stage-only operation position which shuts off the pilot fuel manifold from the pilot stage of the fuel the plurality of the fuel injectors (Port 3 closed), opens a path from the mains fuel manifold to the pilot stage of the plurality of the fuel injectors (Port 2 open), and shuts off the mains fuel manifold from the mains stage of the plurality of the fuel injectors (Port 1 closed), and (ii) the pilot and mains stage operation position which opens a path from the pilot fuel manifold to the pilot stage of the plurality of the fuel injectors (Port 3 open), shuts off the mains fuel manifold from the pilot stage of the plurality of the fuel injectors (Port 2 closed), and opens the path from the mains fuel manifold to the mains stage of the plurality of the fuel injectors (Port 1 open); and each of the first solenoid valves of the second portion of the each of the plurality of the fuel injectors is a two-way solenoid valve.

3. The combustion staging system of claim 1, further including a flow measuring device, wherein the flow measuring device measures the fuel flow sent from the splitting unit (FSU) to the mains fuel manifold, and a the fuel flow measured from the flow measuring device is used by the splitting unit to control splitting of a the fuel flow.

4. The combustion staging system of claim 1, wherein the splitting unit (FSU) varies relative sizes of the first part of the pilot flow and the second part of the pilot flow in the pilot stage-only operation.

5. The combustion staging system of claim 1, wherein the first solenoid valves are operable to perform circumferential staging of the mains stages of the plurality of the fuel injectors.

6. A gas turbine engine for an aircraft comprising: the multi-stage combustor, and the combustion staging system for the plurality of the fuel injectors of the multi-stage combustor according to claim 1.

7. The gas turbine engine according to claim 6, further comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft.

8. The gas turbine engine according to claim 7, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

* * * * *